United States Patent
Shakir et al.

(10) Patent No.: US 8,575,247 B2
(45) Date of Patent: Nov. 5, 2013

(54) HIGH FLOW POLYVINYL HALIDE COMPOUND AND METHODS OF MAKING AND USING SAME

(75) Inventors: Saleem Shakir, Westlake, OH (US); Sang Lee, Westlake, OH (US)

(73) Assignee: PolyOne Corporation, Avon Lake, OH (US)

( * ) Notice: Subject to any disclaimer, the term of this patent is extended or adjusted under 35 U.S.C. 154(b) by 372 days.

(21) Appl. No.: 13/056,654

(22) PCT Filed: Aug. 4, 2009

(86) PCT No.: PCT/US2009/052628
§ 371 (c)(1),
(2), (4) Date: Jan. 29, 2011

(87) PCT Pub. No.: WO2010/017155
PCT Pub. Date: Feb. 11, 2010

(65) Prior Publication Data
US 2011/0130496 A1 Jun. 2, 2011

Related U.S. Application Data

(60) Provisional application No. 61/086,415, filed on Aug. 5, 2008.

(51) Int. Cl.
*C08K 5/51* (2006.01)
*C08K 5/15* (2006.01)

(52) U.S. Cl.
USPC .......................................... 524/128; 524/114

(58) Field of Classification Search
USPC ................................................... 524/115, 128
See application file for complete search history.

(56) References Cited

U.S. PATENT DOCUMENTS

| | | |
|---|---|---|
| 5,414,035 A | 5/1995 | Lindner et al. |
| 5,670,563 A | 9/1997 | Zinke et al. |
| 5,969,015 A * | 10/1999 | Zinke et al. ................... 524/109 |
| 6,919,392 B1 | 7/2005 | Chenard et al. |
| 7,939,006 B2 | 5/2011 | Shakir et al. |

* cited by examiner

*Primary Examiner* — Hui Chin
(74) *Attorney, Agent, or Firm* — John H. Hornickel

(57) ABSTRACT

A high flow polyvinyl halide compound is disclosed. The compound employs conventional ingredients plus a combination of phosphite stabilizer and hydrotalcite stabilizer which improve the melt flow index of the compound by at least 20%, as compared with a compound without the two types of stabilizers. The dramatically improved melt flow allows a molding cycle time reduction by as much as 22% because of a five-fold reduction in the fill step.

20 Claims, No Drawings

HIGH FLOW POLYVINYL HALIDE COMPOUND AND METHODS OF MAKING AND USING SAME

CLAIM OF PRIORITY

This application claims priority from U.S. Provisional Patent Application Ser. No. 61/086,415 and filed on Aug. 5, 2008, which is incorporated by reference.

FIELD OF THE INVENTION

This invention relates to high flow custom-injection-molded poly(vinyl halide) compounds and how to make and use them.

BACKGROUND OF THE INVENTION

Thermoplastic materials have transformed consumer and industrial products, replacing metal, glass, and wood, because such thermoplastic materials do not rust, shatter, or rot, respectively.

Poly(vinyl halide), especially poly(vinyl chloride), has become a common building material for siding, windows, decking, fittings, etc.

As with many manufacturing processes, faster speeds of production result in cost reduction. Unfortunately, injection molding techniques can only operate so fast without sacrificing product quality, because shear burning can occur during molding if injection speeds are too fast and because incomplete mold filling can occur if cycle times are too short.

SUMMARY OF THE INVENTION

What the art needs are injection molding polyvinyl halide compounds which have improved melt flow or spiral flow or both, such that the compound can be used in an injection molding press with faster injection speeds, shorter cycle times, and better processing windows because of improved flow, without sacrificing performance properties, all as compared to what can presently be done with conventional, commercially available polyvinyl halide compounds.

Cycle time reduction can provide the molder shorter injection times, shorter cure times, and greater manufacturing efficiencies. The high flow compound of the present invention has more tolerance for heat at high speed injection velocities.

Improved flow characteristics can also provide the molder with a processing window which permits filling of cavities faster and easier (i.e., less "short shots"), use of thinner wall tooling, less temperature and pressure (energy consumption reduction), and more flexibility in the ability to engineer higher cavitation-style molds.

The present invention solves that problem by using particular ingredients in a high flow polyvinyl halide compound, so that, when the compound is molded by injection into a press, it can be processed faster and better. The particular ingredients are a combination of a phosphite stabilizer and a thermal co-stabilizer, which unexpectedly provide flow modification.

One aspect of the present invention is a high flow polyvinyl halide compound for use in injection molding, comprising (a) polyvinyl halide resin having an inherent viscosity of from about 0.58 to about 0.78 dl/g; (b) phosphite flow modifying stabilizer; (c) hydrotalcite flow modifying stabilizer; (d) organometallic stabilizer; and (e) lubricant, wherein the melt flow index is at least 20% higher than the compound without the phosphite stabilizer and the hydrotalcite stabilizer as measured by using 0.2 grams of resin in 100 ml of cyclohexanone at 30 degrees C. by ASTM D 1243.

Another aspect of the present invention is an article made from a high flow polyvinyl halide compound of the invention via custom-injection-molded ("CIM") techniques.

"Custom-injection-molded" in poly(vinyl halide) technology refers to those grades of poly(vinyl halide) compounds, especially poly(vinyl chloride) compounds, which are able to be injection molded into intricate shapes using complex geometry molds. The compounds of the present invention are particularly suitable for CIM techniques because they have a higher flow, permitting faster cycle times without sacrifice of performance properties.

Other features and advantages will be described in relation to the following embodiments.

EMBODIMENTS OF THE INVENTION

Polyvinyl Halide Resins

Polyvinyl halides are essentially a homopolymer or copolymer of vinyl halide, particularly chloride, with minor amounts of other co-monomers, if any. The most common polyvinyl halide is polyvinyl chloride (PVC) which is one of most common types of thermoplastic used from the mid-$20^{th}$ Century to the present.

A particular embodiment of PVC is CPVC, or chlorinated PVC, where PVC containing approximately 57% chlorine is further reacted with chlorine radicals produced from chlorine gas dispersed in water and irradiated to generate chlorine radicals dissolved in water to produce CPVC, a polymer with a higher glass transition temperature (Tg) and heat distortion temperature. Commercial CPVC typically contains by weight from about 58% to about 70% and preferably from about 63% to about 68% chlorine.

PVC comprises polymerized vinyl chloride monomer where preferred polymers are essentially homopolymerized vinyl chloride with little or no copolymerized co-monomers. Useful co-monomers if desired include mono-unsaturated ethylenically unsaturated monomer copolymerizable with vinyl chloride monomer by addition polymerization. Useful co-monomers include other vinyl monomers such as vinyl acetate, ethers, and vinylidene chloride. Other useful co-monomers comprise mono-ethylenically unsaturated monomers including acrylics such as lower alkyl acrylates or methacrylates, acrylic and methacrylic acid, lower alkenyl olefins, vinyl aromatics such as styrene and styrene derivatives, and vinyl esters and ethers. Typical useful commercial co-monomers include acrylonitrile, 2-ethylhexyl acrylate, vinylidene chloride, and isobutyl ether. Useful PVC and CPVC copolymers can contain from about 0.1% to about 10% or 15%, preferably from about 0.5% to about 5%, by weight of copolymerized co-monomer.

CPVC copolymers can be obtained by chlorinating such PVC copolymers using conventional methods such as that described in U.S. Pat. No. 2,996,489, which is incorporated herein by reference.

Preferred PVCs as starting materials are suspension polymerized vinyl chloride, although less preferred mass (bulk) polymerized can be useful. Rigid PVCs contain essentially no plasticizer, and preferably less than about 10 or about 5 weight parts of copolymerized co-monomer based 100 weight parts of vinyl chloride, and most preferably are essentially homopolymers of vinyl chloride.

Useful weight average molecular weights of PVCs and CPVCs can be from about 39,000 to about 150,000, and preferably from about 55,000 to about 109,000, where the molecular weight is measured by size exclusion chromatography and correlated to absolute PVC molecular weights determined by Perkins et al., Journal of Vinyl Technology, Vol. 15, No. 2 (1993).

The PVC or CPVC resin can have an inherent viscosity from about 0.58 to about 0.78, desirably from about 0.60 to about 0.75, and preferably from about 0.65 to about 0.70 as measured by using 0.2 grams of resin in 100 ml of cyclohexanone at 30 degrees C. by ASTM D 1243.

The PVCs or CPVCs of this invention have a K Value ranging from about 52 to 60.

Commercially available PVC resins can be used meeting the specifications stated above. Non-limiting sources of commercial PVC resin are ShinTech of Houston, Tex. USA; Kaneka Texas Corporation of Pasadena, Tex., USA; and Oxyvinyls, LLC of Dallas, Tex., USA.

Commercially available CPVC resins can be used meeting the specifications stated above. Non-limiting sources of commercial CPVC resin are Sekisui America Corporation of New York, N.Y., USA; Kaneka Texas Corporation of Pasadena, Tex., USA; and Noveon Corporation of Brecksville, Ohio, USA.

Phosphite Stabilizers as Flow Modifiers

Organic phosphites (triesters of phosphorous acid) are known costabilizers for chlorine-containing polymers. Unexpectedly, in the present invention, it has been found that organic phosphites, advertised as thermal co-stabilizers, provide the higher flow performance for polyvinyl halide compounds, which results in cycle time reduction, improved mold flow, and other benefits identified above. Therefore, these organic phosphites serve as flow modifiers.

Examples of organic phosphites are trioctyl, tridecyl, tridodecyl, tritridecyl, tripentadecyl, trioleyl, tristearyl, triphenyl, tricresyl, tris (nonylphenyl), tris (2,4-tert-butylphenyl) and tricyclohexyl phosphite, and combinations thereof.

Other suitable phosphites are various mixed aryl dialkyl or alkyl diarylphosphites, such as phenyl dioctyl, phenyl didecyl, phenyl didodecyl, phenyl ditridecyl, phenyl and glycidyl methacrylate as homo- or copolymer and combinations thereof. Of all possible candidates, 2-ethylhexyl diphenyl phosphite (EHDP) is preferred.

Non-limiting examples of commercial organic phosphites are Weston EHDP, Weston PDDP, Weston DPDP, and Weston 430 branded costabilizers from Chemtura Corporation of Middlebury, Conn., USA.

Hydrotalcite Stabilizer as Flow Modifier

Any heat stabilizer useful with polyvinyl halide compounds is a candidate for use in the present invention. However, it has been found that hydrotalcite-type heat stabilizers are particularly useful to improve flow when they are used with phosphite flow modifying stabilizers identified above.

Some examples of hydrotalcite thermal co-stabilizers useful in the present invention are those represented by formula (I):

$$Mg_{1-x}Al_x(OH)_2A^{n-}{}_{x/n} \cdot mH_2O \quad (I)$$

wherein $0 < x \leq 0.5$, preferably $0.2 \leq x \leq 0.4$;

$A^{n-}$ denotes an anion of n-valence, preferably $CO_3^{2-}$ or $SO_4^{2-}$; and m is a positive number.

Other examples of hydrotalcite thermal co-stabilizers useful in the present invention are those hydrotalcites represented by formula (II):

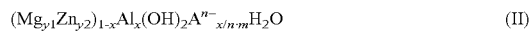
$$(Mg_{y1}Zn_{y2})_{1-x}Al_x(OH)_2A^{n-}{}_{x/n} \cdot mH_2O \quad (II)$$

wherein $A^{n-}$ denotes an anion of n-valence, preferably $CO_3^{2-}$ or $ClO_4^{-}$;

$0 < x \leq 0.5$;
$0.5 < y1 < 1$;
$0 < y2 < 0.5$; and
$0 \leq m < 2$.

Both of these types of hydrotalcites are well-described in U.S. Pat. No. 5,106,898.

Non-limiting examples of commercially available hydrotalcite thermal co-stabilizers include Alcamizer brand "hydrotalcite-type compound" heat stabilizers from Kisuma Chemicals, a business unit of Kyowa Chemical Industry Co. Ltd. of Kagawa, Japan.

Organometallic Heat Stabilizers

Tin-based heat stabilizers are a common ingredient for polyvinyl halide compounds. Typical tin-based heat stabilizers include organometallic esters and mercaptides, such as octyl tin maleate stabilizers and octyl tin mercaptide stabilizers. The presence of organometallic heat stabilizers assists in the CIM technique, while the phosphite and hydrotalcite stabilizers serve as flow modifiers for the compounds of the present invention Lubricant Lubricants are conventional additives to polyvinyl halide compounds. There are generally two types: internal lubricants which assist the mixing and dispersion of the ingredients within the shearing action of an extruder and external lubricants which assist the molten mass to move through the extruder. There are many commercially available lubricants such as stearates, paraffin waxes, other esters, etc.

Optional Additives

The compound of the present invention can include conventional plastics additives in an amount that is sufficient to obtain a desired processing or performance property for the compound, so long as the optional additive does not harm the optical clarity of the compound when formed into an article such as a pipe. The amount should not be wasteful of the additive nor otherwise detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

CIM compounds can include fillers, pigments and colorants if desired, impact modifiers, uv-stabilizers, other processing aids, as well as other additives such as biocides or flame retardants, without departing from the scope of this invention.

Fillers ordinarily are used to reduce cost and gloss and can include conventional calcium carbonates, clay, talc, mica, and diatomaceous earth fillers. Useful pigments and colorants can be organic, but preferably mineral such as titanium dioxide (which also serves as a uv-stabilizer).

Impact modifiers are useful in rigid PVCs and CPVCs to increase toughness and can include chlorinated polyethylenes, ABS, acrylic polymers and copolymers, or methacrylic copolymers such as methylmethacrylate-butadiene-styrene (MBS).

Other processing aids for extruding rigid PVCs and CPVCs in complex profiles include acrylic or styrene-acrylonitrile copolymers to prevent edge tear in the extrusion of complex profiles or configurations.

Table 1 shows acceptable and preferred ingredients for the compounds of the present invention, expressed in parts per hundred of polyvinyl halide resin. Because all ingredients but the three types of stabilizers and lubricant are optional, all are listed as having a range from 0 to a higher value

TABLE 1

| Ingredient | Parts Per Hundred Resin Ranges | |
| --- | --- | --- |
|  | Acceptable | Preferred |
| Polyvinyl halide resin | 100 | 100 |
| Organometallic heat stabilizer | 1-4 | 2.0-2.5 |
| Phosphite flow modifying stabilizer | 0.2-4 | 0.5-1 |
| Hydrotalcite flow modifying stabilizer | 0.2-2 | 0.3-0.7 |
| Impact modifier | 0-15 | 1-5 |
| Process aid for fusion | 0-4 | 1-3 |
| Filler | 0-10 | 3-8 |
| Lubricant | 1-5 | 2-3 |
| Pigment | 0-4 | 0-2 |

Processing

The preparation of compounds of the present invention is uncomplicated to those skilled in the art of thermoplastic compounding. The compound of the present can be made in batch or continuous operations.

Mixing in a continuous process typically occurs in an extruder, continuous mixer, or other device that is elevated to a temperature that is sufficient to melt the polymer matrix with addition either at the head of the extruder or downstream in the extruder of the solid ingredient additives. Extruder speeds are dependent on the size of the extruder and can range from about 50 to about 500 revolutions per minute (rpm), and preferably from about 100 to about 300 rpm for most extruders having a diameter of approximately 5 to 23 cm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives of any optional additive. The mixing speeds range from 60 to 1000 rpm and temperature of mixing can be ambient. Also, the output from the mixer is chopped into smaller sizes for later extrusion or molding into polymeric articles.

Alternatively, mixing in a batch process typically occurs in a Henschel mixer that mixes via mechanical action rather than bringing the polymer matrix a melting temperature. The mixing speeds range from 60 to 1000 rpm and temperature of mixing can be ambient. Also, the output from the mixer in powder form can be used as is or fed into a compounding machine is chopped into smaller sizes for later extrusion or molding into polymeric articles.

Compounds can be formed into powder, cubes, or pellets for further extrusion or molding into polymeric rigid plastic components.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

Usefulness of the Invention

Extrudate pipe and molded fittings for such pipe made using a compound of the present invention benefit from as much as a 5 time reduction in fill time, from 25 seconds to 5 seconds, an enormous cost reduction of energy or an enormous increase in productivity, depending on perspective of the advantage obtained from using compounds of the present invention in CIM techniques.

Intricate molded plastic articles are achieved. Such articles can include fittings of all types for use in industrial, construction, automotive, appliance, and other markets.

EXAMPLES

Table 2 shows the ingredients and recipes used for Comparative Example A and Examples 1 and 2.

TABLE 2

| Ingredient Name | Comparative Example A | | Example 1 | | Example 2 | |
| --- | --- | --- | --- | --- | --- | --- |
|  | (phr) | (wt. %) | (phr) | (wt. %) | (phr) | (wt. %) |
| Oxyvinyls 185 PVC Resin (0.68 IV) | 100.000 | 87.85 | 100.000 | 86.90 | 100.000 | 86.90 |
| Mark 2294 Organometallic Stabilizer | 2.200 | 1.93 | 2.200 | 1.91 | 2.200 | 1.91 |
| Weston EHDP Phosphite Flow Modifying Stabilizer | 0.000 | 0.00 | 0.750 | 0.65 | 0.750 | 0.65 |
| Kyowa Alcamizer MHT-PD Hydrotalcite Flow Modifying Stabilizer | 0.000 | 0.00 | 0.500 | 0.43 | 0.500 | 0.43 |
| Arkema Plastistrength 550 acrylic process aid | 1.500 | 1.32 | 1.500 | 1.30 | 1.500 | 1.30 |
| Paraloid K-175 acrylic process aid | 0.750 | 0.66 | 0.750 | 0.65 | 0.750 | 0.65 |
| Calcium Stearate | 1.000 | 0.88 | 1.000 | 0.87 | 1.000 | 0.87 |
| Paraffin wax | 0.850 | 0.75 | 0.850 | 0.74 | 0.850 | 0.74 |
| Honeywell OPE-AC-629-A polyethylene wax lubricant | 0.750 | 0.66 | 0.750 | 0.65 | 0.750 | 0.65 |
| Omya Omycarb UFT Filler | 5.000 | 4.39 | 5.000 | 4.34 | 5.000 | 4.34 |
| Tiona RCL-88 Whitener | 1.750 | 1.54 | 1.750 | 1.52 | 1.750 | 1.52 |
| RTMB Colorant | 0.025 | 0.02 | 0.025 | 0.02 | 0.025 | 0.02 |
| Total | 113.825 | 100.00 | 115.075 | 100.00 | 115.075 | 100.00 |

Table 3 shows the manufacturing conditions for Comparative Example A and Example 2 and Example 1, based on high intensity mixing and then milling.

TABLE 3

Mixing and Compounding/Pelletizing

| | Comparative Example A and Example 1 | Example 2 |
|---|---|---|
| Equipment | 150 liter mixer | Henschel 1000 liter mixer |
| Mixing Speed | 1500 rpm | 666 rpm |
| Order of Addition of Ingredients | PVC Resin, Stabilizers, Processing Aids, Lubricants, Filler and Colorant | PVC Resin, Stabilizers, Processing Aids, Lubricants, Filler and Colorant |
| Drop Temperature | 160° F. | 160° F. |
| ET RPM | 19.6 | 40 |
| ET AMPS | — | — |
| KS RPM | 167 | 160 |
| KS AMPS | 18 | 610 |
| RS RPM | 33.4 | 44 |
| GS RPM | 51 | 42 |
| GS AMPS | — | 24 |
| KS Screw Temp. | 300° F. | 166° F. |
| KS Barrel Temp. | 310° F. | 168° F. |
| RS Screw Temp. | 300° F. | 73° F. |
| RS Barrel Temp. | 300° F. | 73° F. |
| GS Screw Temp. | 300° F. | 150° F. |
| GS Barrel Temp. | 310° F. | 220° F. |
| Die Temp. | 370° F. | 270° F. |
| Melt Bun Temp. | 365° F. | 340° F. |

TABLE 3-continued

Mixing and Compounding/Pelletizing

| | Comparative Example A and Example 1 | Example 2 |
|---|---|---|
| Melt Zone 5 Temp. | — | 337° F. |
| Form of Product | Pellets | Pellets |

Thereafter, the Examples and Comparative Examples were then molded into plaques using injection molding settings for an 85T Van Dorn molding machine, as explained in Table 4.

Two different molds were used. The spiral flow mold was used to measure spiral flow properties. The melt flow mold was used to measure Melt Flow Index and the other physical properties reported in Table 5.

Spiral flow is a common test for thermoplastic compounds but is not reduced to a standardized ASTM test. Spiral flow, it has been found for PVC compounds, is an accurate predictor of performance of the compound during the filling of intricate injection molds.

In the spiral test of the compounds molded according to the applicable portion of Table 4, the conditions were utilized with a mold in the shape of a continuous spiral approximately 14 cm in outermost diameter of the first loop curving continuously inwardly to a second loop having a diameter of approximately 12.5 cm and then to a third loop having a diameter of approximately 10.5 cm, etc. Depending on how far the compound flows, the loops get continuously smaller in diameter. The length of flow is measured in inches or cm. The interior of the spiral had constant dimensions of about 3 mm by 5 mm. The relative flows in inches or cm of the control vs. the inventive examples provide the best indexed comparison.

The flow of melted PVC compound entered the spiral flow mold at an angle orthogonal to the plane of the mold. In addition to that abrupt 90° angle turn, the melt was subjected to continuous shearing as it progressed on the spiral of constantly increasing arc both with gravity and against gravity.

TABLE 4

| | Spiral Flow Mold | | | Melt Flow Mold | | |
|---|---|---|---|---|---|---|
| | A | 1 | 2 | A | 1 | 2 |
| Rear Barrel Temp (° F.) | 360 | 360 | 360 | 360 | 360 | 360 |
| Center Barrel Temp. (° F.) | 365 | 365 | 365 | 365 | 365 | 365 |
| Front Barrel Temp. (° F.) | 370 | 370 | 370 | 370 | 370 | 370 |
| Nozzle Barrel Temp. (° F.) | 375 | 375 | 375 | 375 | 375 | 375 |
| Screw Speed (rpm) | 80 | 80 | 80 | 80 | 80 | 80 |
| Melt Temp. (° F.) | 387 | 390 | 389 | 394 | 394 | 389 |
| Mold Temp. Ejector (° F.) | 72 | 72 | 72 | 72 | 72 | 72 |
| Mold Temp. Stationary Side (° F.) | 73 | 73 | 73 | 72 | 72 | 72 |
| Injection Speed (in/sec) | 1.5 | 1.5 | 1.5 | 0.9 | 0.9 | 0.9 |
| Injection Pressure (psig) max | 2243 | 2240 | 2260 | 1074 | 1069 | 1061 |
| Hold Pressure (psig) | | | | 700 | 700 | 700 |
| Shot Size (in.) | 1.45 | 1.50 | 1.50 | 4.2 | 4.2 | 4.2 |
| Cushion (in.) | 0.194 | 0.207 | 0.185 | 0.136 | 0.081 | 0.081 |
| Pack Time - Cut Off (sec.) | 0.1 | 0.1 | 0.1 | | | |
| Hold Time (sec.) | | | | 5 | 5 | 5 |
| Cooling Time (sec.) | 25 | 25 | 25 | 30 | 30 | 30 |

The molded parts of both Examples and Comparative Example A from Table 4 were tested for physical properties, obtaining the results as seen in Table 5.

TABLE 5

Physical Properties

| Property | Comp. A | Ex. 1 | Ex. 2 |
|---|---|---|---|
| | Flow | | |
| Spiral Flow (in.) | 27.125 | 28.250 | 29.375 |
| Spiral Flow (cm) | 68.898 | 71.755 | 74.613 |
| % Increase | — | 4.1% | 8.3% |

TABLE 5-continued

Physical Properties

| Property | Comp. A | Ex. 1 | Ex. 2 |
|---|---|---|---|
| Melt Flow Index (g/10 min.) ASTM 1238 21.6 kg | 11.772 | 16.768 | 14.891 |
| % Increase | — | 42.4% | 26.5% |
| Impact ASTM D256 | | | |
| Notched Izod 1/8 in. (ft./lb.) | 1.2 | 1.1 | 1.0 |
| Std. Dev. | 0.1 | 0.1 | 0.1 |
| Mode | 5P | 5P | 5P |
| Tensile ASTM D638 0.2 in./min. | | | |
| Stress @ Yield (psi) | 6910 | 7096 | 7332 |
| Std. Dev. | 14 | 15 | 13 |
| Modulus (psi) | 469,400 | 466,000 | 457,000 |
| Std. Dev. | 5595 | 3536 | 4382 |
| Flexural ASTM D790 | | | |
| Stress @ Yield (psi) | 12,700 | 12,900 | 12,900 |
| Std. Dev. | 45 | 33 | 47 |
| Modulus (psi) | 465,000 | 469,000 | 461,000 |
| Std. Dev. | 1760 | 2160 | 1370 |
| Heat Deflection Temperature ASTM D648 (1/8 in.; 264 psi) Average of 2 tests | | | |
| Unannealed | 60.4 | 60.7 | 57.5 |
| Annealed at 50° C., 24 hr. | 69.9 | 68.6 | 68.6 |
| Annealed at 50° C., 48 hr. | 71.1 | 70.6 | 69.5 |
| Annealed at 55° C., 24 hr. | 72.1 | 71.9 | 70.8 |

Table 5 shows that the physical performance properties of impact, tensile, flexural, and heat deflection are very similar between Comparative Example A and either of Examples 1 or 2, but that both Examples 1 and 2 have vastly superior melt flow.

In order to test performance during injection molding, samples of Comparative Example A and Example 2 were compared on an industrial scale molding press (B-7 made by Cincinnati Millacron with an 18 cavity 1.5 in. M.A. MXS with a well-designed ejection system) this mold used a tool known to normally be more sensitive to shear burning, caused when the injection speed exceeds 0.30 inches/sec. The normal fill time for Comparative Example A to avoid shear burning was 25 seconds. Using samples of Example 2, the fill time was reduced to 5 seconds without shear burning or inadequate mold cavity filling of the 18 cavity mold. That is a five-fold improvement in fill time, which with the unchanged molding and ejection times, allows a 22% increase in total mold cycle time.

To demonstrate that parts molded from Example 2 using a fill time of 5 seconds performed as well as parts molded from Comparative Example A using a fill time of 25 seconds, parts from both were subjected to burst and crush tests conducted by a third party under confidential, developmental conditions using procedures confidential to the third party. Though the details of those tests can not disclosed, it can be reported that the test results for Example 2 and Comparative Example A were comparable. The five-fold reduction in fill time was considered quite exciting.

The only difference between Comparative Example A and either Example 1 or Example 2 is the presence of phosphite flow modifying stabilizer and hydrotalcite flow modifying stabilizer. Not only is the cycle time reduction truly tremendous (22%), but also the cost savings or productivity improvement a real gain for customers of the compounds of the present invention.

The invention is not limited to the above embodiments. The claims follow.

What is claimed is:

1. A high flow polyvinyl halide compound for use in injection molding and having a melt flow index, comprising:
   (a) polyvinyl halide resin having an inherent viscosity of from about 0.58 to about 0.78 dl/g, as measured by using 0.2 grams of resin in 100 ml of cyclohexanone at 30 degrees C. by ASTM D 1243;
   (b) phosphite flow modifying stabilizer;
   (c) hydrotalcite flow modifying stabilizer;
   (d) organometallic stabilizer; and
   (e) lubricant,
   wherein the polyvinyl halide resin has a K value ranging from about 52 to about 60, and wherein the melt flow index of the compound is at least 20% higher than that of the compound without presence of the phosphite flow modifying stabilizer and the hydrotalcite flow modifying stabilizer as measured by ASTM 1238 using 21.6 kg.

2. The compound of claim 1, wherein the polyvinyl halide is a homopolymer or copolymer of vinyl chloride with minor amounts of other co-monomers, if any, and optionally containing by weight from about 58% to about 70% chlorine.

3. The compound of claim 2, wherein the co-monomer is selected from the group consisting of mono-unsaturated ethylenically unsaturated monomer, vinyl acetate monomer, vinylidene chloride monomer, acrylic monomer, vinyl aromatic monomer, vinyl ester monomer, and combinations thereof, and wherein the co-monomer is present in an amount from about 0.1% to about 15% by weight of copolymer.

4. The compound of claim 1, wherein the polyvinyl halide resin has a weight average molecular weight of from about 39,000 to about 150,000.

5. The compound of claim 1, wherein the polyvinyl halide resin has an inherent viscosity from about 0.60 to about 0.75, as measured by using 0.2 grams of resin in 100 ml of cyclohexane at 30 degrees C. by ASTM D 1243.

6. The compound of claim 1, wherein the polyvinyl halide resin has an inherent viscosity ranging from about 0.65 dl/g to about 0.70 dl/g as measured using 0.2 grams of resin in 100 ml of cyclohexanone at 30 degrees C. by ASTM D 1243.

7. The compound of claim 1, wherein the melt flow index is at least 25% higher.

8. The compound of claim 1, wherein the phosphite flow modifying stabilizer is selected from the group consisting of trioctyl phosphite, tridecyl phosphite, tridodecyl phosphite, tritridecyl phosphite, tripentadecyl phosphite, trioleyl phosphite, tristearyl phosphite, triphenyl phosphite, tricresyl phosphite, tris (nonylphenyl) phosphite, tris (2,4-tert-butylphenyl) phosphite, tricyclohexyl phosphite, aryl dialkyl phosphites, alkyl diaryl phosphites, and combinations thereof.

9. The compound of claim 1, wherein the phosphite flow modifying stabilizer is selected from the group consisting of phenyl dioctyl phosphite, phenyl didecyl phosphite, phenyl didodecyl phosphite, phenyl ditridecyl phosphite, phenyl methacrylate phosphate, and glycidyl methacrylate phosphite.

10. The compound of claim 1, wherein the phosphite flow modifying stabilizer is 2-ethylhexyl diphenyl phosphite.

11. The compound of claim 1, wherein the hydrotalcite flow modifying stabilizer is selected from the group of formulae consisting of $$Mg_{1-x}Al_x(OH)_2A^{n-}{}_{x/n}\cdot mH_2O$$

wherein $0<x\leq0.5$; $A^{n-}$ denotes an anion of n-valence; and m is a positive number;

$$(Mg_{y1}Zn_{y2})_{1-x}Al_x(OH)_2A^{n-}{}_{x/n}\cdot mH_2O$$

wherein $A^{n-}$ denotes an anion of n-valence; $0<x\leq0.5$; $0.5<y1<1; 0<y2<0.5$; and $0\leq m<2$;
and combinations thereof.

12. The compound of claim 1, wherein the heat stabilizer is selected from the group consisting of organometallic esters, organometallic mercaptides and combinations thereof.

13. The compound of claim 1, wherein the lubricant is selected from the group consisting of stearates, paraffin waxes, lubricating esters, and combinations thereof.

14. An article made from a high flow polyvinyl halide compound of claim 1 using custom-injection-molded techniques wherein the higher melt flow index reduces cycle time.

15. The article of claim 14, wherein the phosphite flow modifying stabilizer in the high flow polyvinyl halide compound is selected from the group consisting of trioctyl phosphite, tridecyl phosphite, tridodecyl phosphite, tritridecyl phosphite, tripentadecyl phosphite, trioleyl phosphite, tristearyl phosphite, triphenyl phosphite, tricresyl phosphite, tris(nonylphenyl) phosphite, tris(2,4-tert-butylphenyl) phosphite, tricyclohexyl phosphite, aryl dialkyl phosphites, alkyl diaryl phosphites, and combinations thereof.

16. The article of claim 14, wherein the hydrotalcite flow modifying stabilizer in the high flow polyvinyl halide compound is selected from the group of formulae consisting of $$Mg_{1-x}Al_x(OH)_2A^{n-}{}_{x/n}\cdot mH_2O$$

wherein $0<x\leq0.5$; $A^{n-}$ denotes an anion of n-valence; and m is a positive number;

$$(Mg_{y1}Zn_{y2})_{1-x}Al_x(OH)_2A^{n-}\cdot mH_2O$$

wherein $A^{n-}$ denotes an anion of n-valence; $0<x\leq0.5$; $0.5<y1<1; 0<y2<0.5$; and $0\leq m<2$;
and combinations thereof.

17. The article of claim 14, wherein the heat stabilizer in the high flow polyvinyl halide compound is selected from the group consisting of organometallic esters, organometallic mercaptides and combinations thereof.

18. The article of claim 14, wherein the lubricant in the high flow polyvinyl halide compound is selected from the group consisting of stearates, paraffin waxes, lubricating esters, and combinations thereof.

19. The article of claim 14, wherein the phosphite flow modifying stabilizer in the high flow polyvinyl halide compound is present in the compound at 0.2-4 parts per hundred of polyvinyl halide resin and is 2-ethylhexyl diphenyl phosphite.

20. The article of claim 19, wherein the hydrotalcite flow modifying stabilizer in the high flow polyvinyl halide compound is present in the compound at 0.2 - 2 parts per hundred of polyvinyl halide resin and is selected from the group of formulae consisting of $$Mg_{1-x}Al_x(OH)_2A^{n-}{}_{x/n}\cdot mH_2O$$

wherein $0<x\leq0.5$; $A^{n-}$ denotes an anion of n-valence; and m is a positive number;

$$(Mg_{y1}Zn_{y2})_{1-x}Al_x(OH)_2A^{n-}{}_{x/n}\cdot mH_2O$$

wherein $A^{n-}$ denotes an anion of n-valence; $0<x\leq0.5$; $0.5<y1<1; 0<y2<0.5$; and $0\leq m<2$;
and combinations thereof.

* * * * *

UNITED STATES PATENT AND TRADEMARK OFFICE
CERTIFICATE OF CORRECTION

PATENT NO. : 8,575,247 B2
APPLICATION NO. : 13/056654
DATED : November 5, 2013
INVENTOR(S) : Saleem Shaker and Sang Lee It is certified that error appears in the above-identified patent and that said Letters Patent is hereby corrected as shown below:

In the Claims

Column 12, line 3, "$(Mg_{y1}Zn_{y2})_{1-x}Al_x(OH)_2A^{n-} \cdot mH_2O$" should be changed to -- $(Mg_{y1}Zn_{y2})_{1-x}Al_x(OH)_2A^{n-}{}_{x/n} \cdot mH_2O$ --

Signed and Sealed this
Fourth Day of August, 2015

Michelle K. Lee
*Director of the United States Patent and Trademark Office*